(No Model.)
T. A. EDISON.
REGULATOR FOR DYNAMO ELECTRIC MACHINES.
No. 264,673. Patented Sept. 19, 1882.
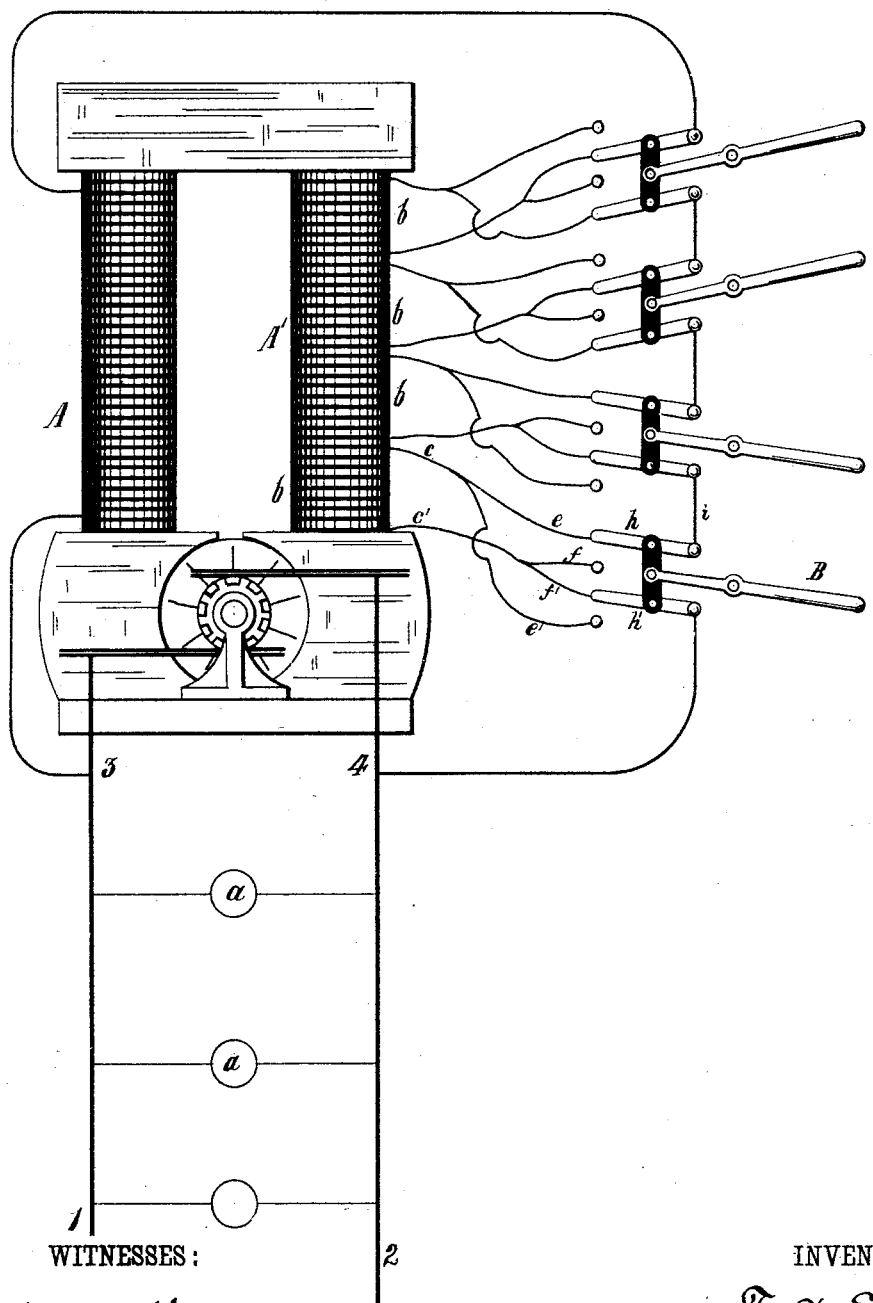
WITNESSES:
O. D. Mott
J. Ellis Clark.
INVENTOR:
T. A. Edison
BY Dyer & Wilber
ATTORNEYS.
N. PETERS. Photo-Lithographer, Washington, D. C.

UNITED STATES PATENT OFFICE.

THOMAS A. EDISON, OF MENLO PARK, NEW JERSEY, ASSIGNOR TO THE EDISON ELECTRIC LIGHT COMPANY, OF NEW YORK, N. Y.

REGULATOR FOR DYNAMO-ELECTRIC MACHINES.

SPECIFICATION forming part of Letters Patent No. 264,673, dated September 19, 1882.

Application filed November 28, 1881. Renewed August 14, 1882. (No model.)

*To all whom it may concern:*

Be it known that I, THOMAS A. EDISON, of Menlo Park, in the county of Middlesex and State of New Jersey, have invented a new and useful Improvement in Regulating the Generative Capacity of Dynamo or Magneto Electric Machines, (Case No. 366;) and I do hereby declare that the following is a full and exact description of the same, reference being had to the accompanying drawing, and to the letters of reference marked thereon.

My invention consists in regulating the strength of the field-magnets of a dynamo or magneto electric machine and the current generated by such machine by reversing the current passing through more or less of the field-coils. This I do by winding the magnets in sections or bobbins, each section being provided with means for reversing the direction of its current. A convenient arrangement for this purpose is shown in the annexed drawing.

A A' are the helices of the field-magnet of a dynamo-electric machine. 1 2 is the main circuit from such machine, having translating devices $a\ a$ arranged in multiple arc upon them. 3 4 is the field-circuit by which the magnet A A' is energized. The helix A' is wound in separate sections $b\ b$, each end of the wire of each section extending out from the magnet. The arrangement of the lowest section, $b$, will illustrate that of the rest.

$c\ c'$ are the wire ends, each divided into two branches, $e\ e'$ and $f f'$.

B is a circuit-reversing lever moving the pivoted arms $h\ h'$.

As shown in the drawing, the current is passing through all the coils of the helix in the same direction—viz., by wire 4, pivoted arm $h'$, wires $f'\ c'\ b\ e\ e$, pivoted arm $h$, by a wire, $i$, to the next circuit-reverser, and so on; but if it is desired to reduce the current generated by the machine the lever B is moved so as to bring $h$ in contact with $f$ and $h'$ with $e'$. The direction of the current in the bottom section is thus changed, being now by arm $h'$, wires $e'\ c\ b\ c'\ f$, arm $h$, &c. The strength of the field-magnet is thus reduced. If a still further reduction is necessary, more of the sections $b$ are reversed, as desired.

While only one of the helices is shown as wound in sections, it is evident that this may be done with both, and where the wire is wound upon the core in layers one above another one or more of the layers may be arranged to have their current reversed.

It is evident, also, that other forms of circuit-reversers may be used, and that they may be worked automatically without departing from the spirit of my invention.

This invention is of course equally applicable to dynamo or to magneto electric machines.

What I claim is—

1. The method of regulating the generative capacity of magneto or dynamo electric machines, consisting in reversing the polarity of the current in a greater or less portion of the coils of their field-magnets, substantially as set forth.

2. The combination, with a field-magnet of a dynamo or magneto electric machine, of means for reversing the polarity of the current in a greater or less portion of the coils of the magnet, substantially as set forth.

3. A dynamo or magneto electric machine having one or both of the limbs of its field-magnet wound in separate sections of wire, each section including a circuit-reverser, substantially as set forth.

This specification signed and witnessed this 3d day of November, 1881.

THOS. A. EDISON.

Witnesses:
H. W. SEELY,
RICHD. N. DYER.